(12) United States Patent
Ogata

(10) Patent No.: US 7,909,312 B2
(45) Date of Patent: Mar. 22, 2011

(54) VIBRATION-SHOCK ABSORBING MECHANISM AND CONTENT REPRODUCING APPARATUS

(75) Inventor: Masanori Ogata, Saitama (JP)

(73) Assignee: Sony Corporation, Tokyo (JP)

( * ) Notice: Subject to any disclaimer, the term of this patent is extended or adjusted under 35 U.S.C. 154(b) by 876 days.

(21) Appl. No.: 11/407,557

(22) Filed: Apr. 20, 2006

(65) Prior Publication Data

US 2007/0158887 A1      Jul. 12, 2007

(30) Foreign Application Priority Data

Apr. 20, 2005   (JP) ................... 2005-122277
Mar. 24, 2006   (JP) ................... 2006-082722

(51) Int. Cl.
*F16M 1/00* (2006.01)
(52) U.S. Cl. ............... 267/136; 360/97.01; 361/679.34
(58) Field of Classification Search .............. 267/136, 267/152–153; 248/636–638; 360/97.01–97.03, 360/99.08; 361/685, 679.34
See application file for complete search history.

(56) References Cited

U.S. PATENT DOCUMENTS

| 4,974,819 | A  | * | 12/1990 | Reichard et al. ......... 267/140.11 |
| 5,390,891 | A  | * | 2/1995  | Hornung et al. .............. 248/581 |
| 5,965,249 | A  | * | 10/1999 | Sutton et al. ................ 428/304.4 |
| 6,498,700 | B2 | * | 12/2002 | Takahashi et al. ......... 360/97.01 |
| 6,567,265 | B1 | * | 5/2003  | Yamamura et al. .......... 361/685 |
| 6,898,051 | B2 | * | 5/2005  | Bahirat et al. ............. 360/99.08 |
| 2003/0210519 | A1 | * | 11/2003 | Wubs ........................... 361/685 |
| 2004/0190193 | A1 | * | 9/2004  | Kuwajima ................ 360/97.01 |
| 2005/0007733 | A1 |   | 1/2005  | Byun et al. |

FOREIGN PATENT DOCUMENTS

| JP | 2003-314613 | 11/2003 |
| JP | 2004-139670 | 5/2004 |

* cited by examiner

*Primary Examiner* — Christopher P Schwartz
(74) *Attorney, Agent, or Firm* — Wolf, Greenfield & Sacks, P.C.

(57) ABSTRACT

A vibration-shock absorbing mechanism that protects an object disposed in a housing includes a shock-absorbing member that is disposed in the housing and absorbs a shock, and a resonance-damping member that is disposed between the object and the shock-absorbing member and dampens a vibration and shock in a predetermined frequency range including a resonant frequency of the object.

12 Claims, 15 Drawing Sheets

VIBRATION-SHOCK ABSORBING MECHANISM AND CONTENT REPRODUCING APPARATUS

CROSS REFERENCES TO RELATED APPLICATIONS

This application claims priority to Japanese Patent Application JP 2005-122277 filed in the Japanese Patent Office on Apr. 20, 2005, and to Japanese Patent Application JP 2006-082722 filed in the Japanese Patent Office on Mar. 24, 2006. The entire contents of these documents are incorporated herein by reference.

BACKGROUND OF THE INVENTION

1. Field of the Invention

The present invention relates to a vibration-shock absorbing mechanism that reduces vibration of an object disposed in a housing when a vibration or shock is applied to the housing, and to a content reproducing apparatus equipped with such a mechanism.

2. Description of the Related Art

In portable electronic apparatuses, compactness and low-profile structures are in great demand in view of better portability. In addition to compactness and low-profile structures, portable electronic apparatuses are preferably resistant to vibration and shock in comparison to stationary apparatuses since portable electronic apparatuses are used in mobile environments. In particular, in portable content reproducing apparatuses equipped with devices that are weak against vibration and shock, such as hard disk drives (HDD), the resistance to vibration and shock is even more necessary.

An example of a content reproducing apparatus of related art is illustrated in FIG. 1. The content reproducing apparatus includes a housing 101 and shock-absorbing members 103 disposed between the housing 101 and a hard-disk drive 102, which is an object to be protected disposed inside the housing 101. The shock-absorbing members 103 absorb a vibration and shock applied to the content reproducing apparatus so as to protect the hard-disk drive 102 from the vibration and shock. Referring to FIG. 2, each of the shock-absorbing members 103 is substantially C-shaped in cross section and nips the hard-disk drive 102 from upper and lower surfaces of the hard-disk drive 102.

Even though the shock-absorbing members 103 have a capability to dampen or buffer a vibration and shock in the related art, there is still a possibility that a head of the hard-disk drive 102 may resonate in response to a vibration or shock applied to the content reproducing apparatus. The resonance could cause the head to hit against the disk in the hard-disk drive 102.

SUMMARY OF THE INVENTION

Accordingly, as written above, even though the shock-absorbing members 103 have the capability to dampen or buffer a vibration and shock in the content reproducing apparatus of the related art, there is still a possibility that the head of the hard-disk drive 102 may resonate in response to a vibration or shock applied to the content reproducing apparatus, causing the head to hit against the disk in the hard-disk drive 102.

This is due to the fact that the resonant frequency of the head is included in a frequency range of vibration or shock that is not dampened or buffered by the shock-absorbing members 103 of the content reproducing apparatus.

Accordingly, it is desirable to provide a vibration-shock absorbing mechanism that reduces a resonance of an object to be protected, such as a hard-disk drive, so as to prevent the hard-disk drive from inducing readout errors and writing errors, and also from being damaged.

It is also desirable to provide a content reproducing apparatus, such as an audio player, which protects a device, such as a hard-disk drive, from vibration or shock in a mobile environment. In particular, it is desirable to provide a portable content reproducing apparatus, such as a portable music player.

A vibration-shock absorbing mechanism according to an embodiment of the present invention includes a housing, an object to be protected disposed in the housing, a shock-absorbing member that is disposed in the housing and absorbs a shock, and a resonance-damping member that is disposed between the object and the shock-absorbing member and dampens a vibration and shock in a predetermined frequency range including a resonant frequency of the object.

A content reproducing apparatus according to an embodiment of the present invention includes a housing, a device disposed in the housing and having a readout unit configured to read out content from a storage medium that stores the content, a shock-absorbing member disposed in the housing, a resonance-damping member that is disposed between the device and the shock-absorbing member and dampens a vibration and shock in a predetermined frequency range including a resonant frequency of the device, and a reproducing unit configured to reproduce the content.

DESCRIPTION OF THE PREFERRED EMBODIMENTS

First Embodiment

Figure 1:
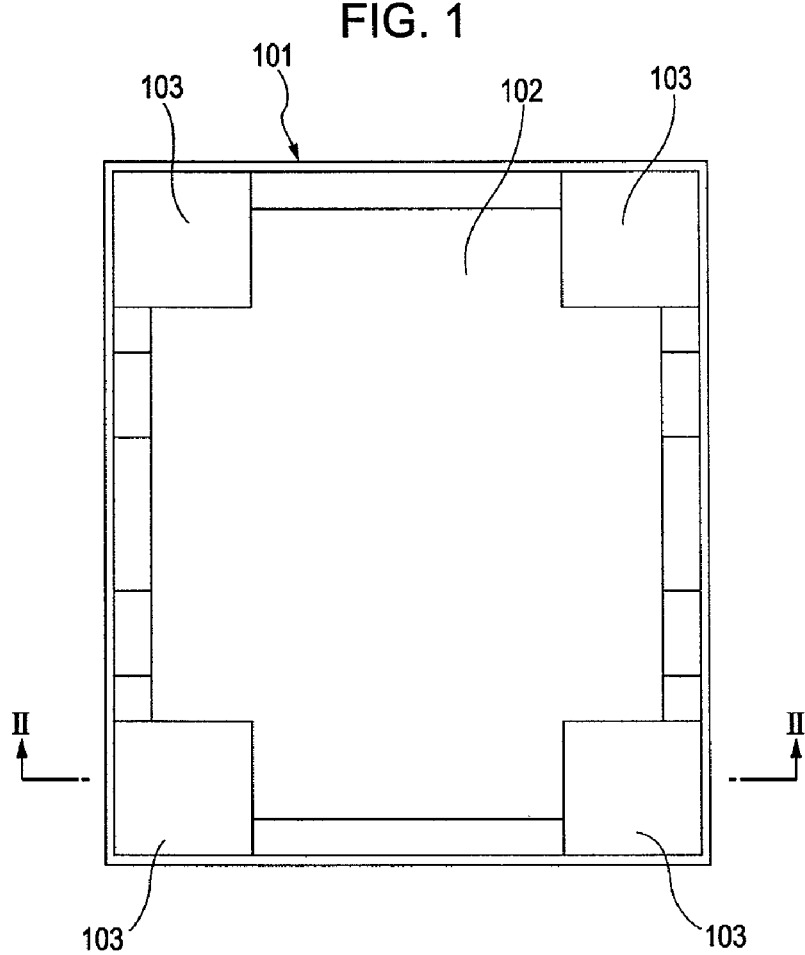
FIG. 1 is a plan view of related art.
Figure 2:
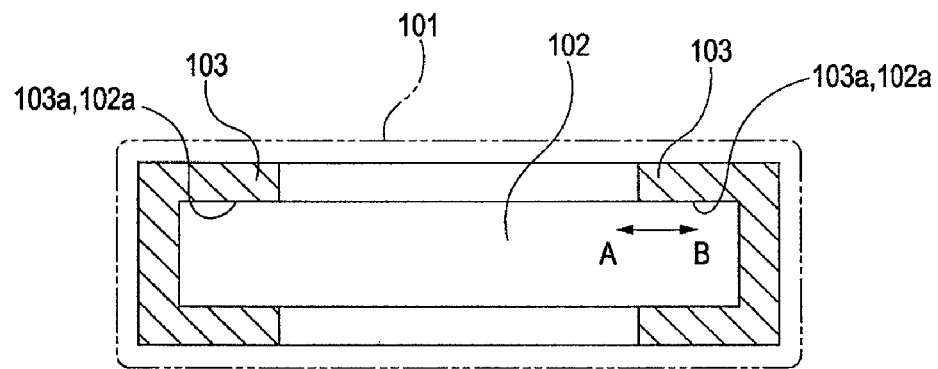
FIG. 2 is a cross-sectional view of the related art.
Figure 3:
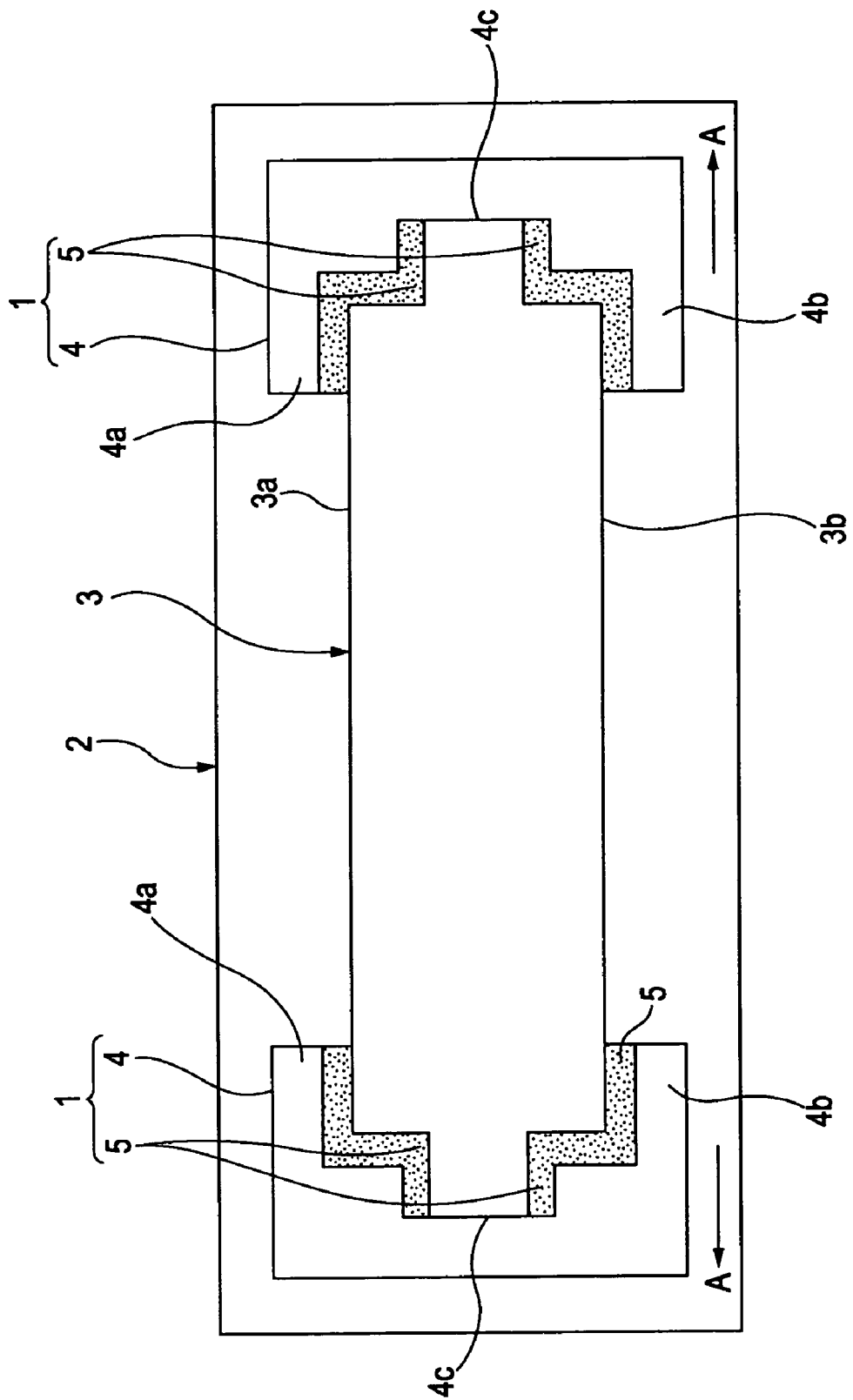
FIG. 3 is a cross-sectional view of a vibration-shock absorbing mechanism and a content reproducing apparatus according to a first embodiment of the present invention.

FIG. 3 is a cross-sectional view of a vibration-shock absorbing mechanism 1 according to a first embodiment of the present invention. The vibration-shock absorbing mechanism 1 includes a housing 2, shock-absorbing members 4, and resonance-damping members 5. The shock-absorbing members 4 are disposed between the housing 2 and an object 3 to be protected disposed inside the housing 2. The resonance-damping members 5 are composed of a material having different vibration damping characteristics from the shock-absorbing members 4 and are disposed between the object 3 and the shock-absorbing members 4.

Each shock-absorbing member 4 is substantially C-shaped in cross section, and has a pair of a first upper segment 4a and second lower segment 4b, and a third mid segment 4c that connects the first and second segments 4a and 4b. The shock-absorbing members 4 are attached to left and right sides of the object 3 in a manner such that the first and second segments 4a and 4b partially nip the object 3 from upper and lower main surfaces 3a and 3b thereof, respectively. Moreover, the shock-absorbing members 4 are formed of an elastic material, such as rubber and elastomer.

The resonance-damping members 5 are attached to sections of the upper and lower main surfaces 3a and 3b where the object 3 is nipped between the inner surfaces of the first and second segments 4a and 4b of the shock-absorbing members 4. Consequently, the inner surfaces of the first and second segments 4a and 4b of the shock-absorbing members 4 nip the object 3 via the resonance-damping members 5 without being in direct contact with the upper and lower main surfaces 3a and 3b.

The resonance-damping members 5 are formed of a so-called nonwoven fabric made into sheets or strips. Nonwoven fabrics will be described here briefly. A nonwoven fabric is formed by intertwining fibers mechanically, or by processing fibers chemically or thermally. In contrast, general textiles and knit fabrics are woven using threads or yarns, which are formed by spinning or twining a group of fibers, and are made through a complicated process using, for example, a loom or knitting device. In accordance with different manufacturing techniques, nonwoven fabrics can be classified into various groups, which includes, for example, thermal-bond nonwoven fabrics, needle-punch nonwoven fabrics, spun-lace nonwoven fabrics, and chemical-bond nonwoven fabrics. In particular, chemical-bond nonwoven fabrics are formed by adhering together the intertwining points of the fibers by applying adhesive resin to the fibers by means of impregnation, spraying or foaming, and then applying heat to the fibers. Therefore, chemical-bond nonwoven fabrics can be manufactured relatively at a low cost, and are thus suitable to be used as the resonance-damping members 5.

Accordingly, in the vibration-shock absorbing mechanism 1 according to the first embodiment, the resonance-damping members 5 intervene the inner surfaces of the first and second segments 4a, 4b of the shock-absorbing members 4 and the upper and lower main surfaces 3a and 3b of the object 3, respectively. Each resonance-damping member 5 formed of a nonwoven fabric has a buffering function. Therefore, by combining the vibration absorbability of the shock-absorbing members 4 and the vibration absorbability of the resonance-damping members 5, vibrations in the high frequency range can be dampened effectively, which may be difficult to achieve with only the shock-absorbing members 4. Furthermore, by forming the resonance-damping members 5 of a material having a coefficient of friction that is higher than that of the shock-absorbing members 4, the shock-absorbing members 4 can be prevented from being displaced in directions indicated by arrows A in FIG. 3 (i.e. directions away from the object 3) even when a vibration or shock is applied from an external source. Furthermore, to further enhance the prevention of such a displacement, the resonance-damping members 5 may be adhered to the upper and lower main surfaces 3a and 3b of the object 3 using friction-generating members, such as double-sided tapes.

Although the resonance-damping members 5 are attached to the upper and lower main surfaces 3a and 3b of the object 3 in the first embodiment, the resonance-damping members 5 may alternatively be attached to only one of the upper and lower main surfaces 3a and 3b. As another alternative, the resonance-damping members 5 may be attached to the side surfaces of the object 3, such that each resonance-damping member 5 intervenes the third segment 4c of the corresponding shock-absorbing member 4 and the corresponding side surface of the object 3. As a further alternative, the resonance-damping members 5 may be formed of paper. In other words, the resonance-damping members 5 may be formed of any type of material as long as the resonance-damping members 5 have a capability to dampen or buffer a vibration or shock in a resonant frequency range of a head unit 37 when a vibration or shock is applied to a content reproducing apparatus 11.

The shock-absorbing members 4 mainly buffer shocks applied to the content reproducing apparatus 11, whereas the resonance-damping members 5 mainly dampen vibrations in a resonant frequency range of the object 3.

Figure 4:
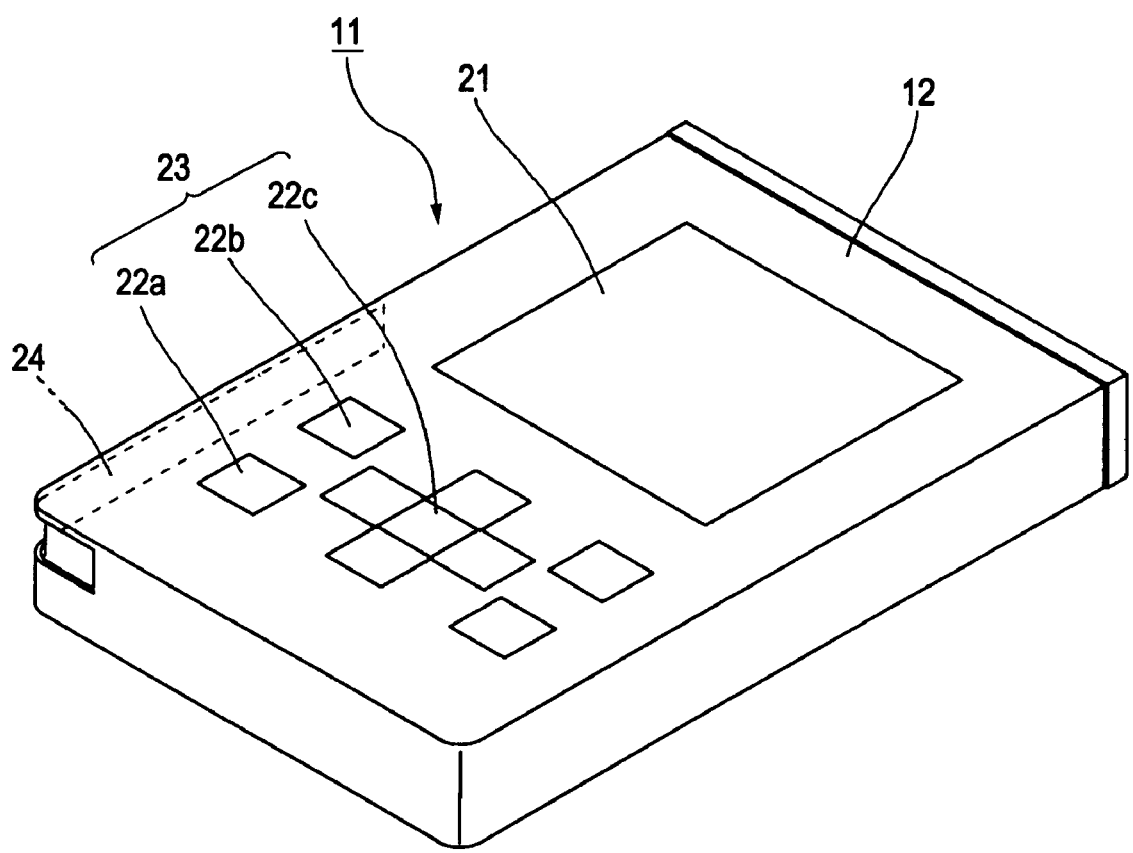
FIG. 4 is a perspective view of the content reproducing apparatus according to the first embodiment of the present invention.
Figure 5:
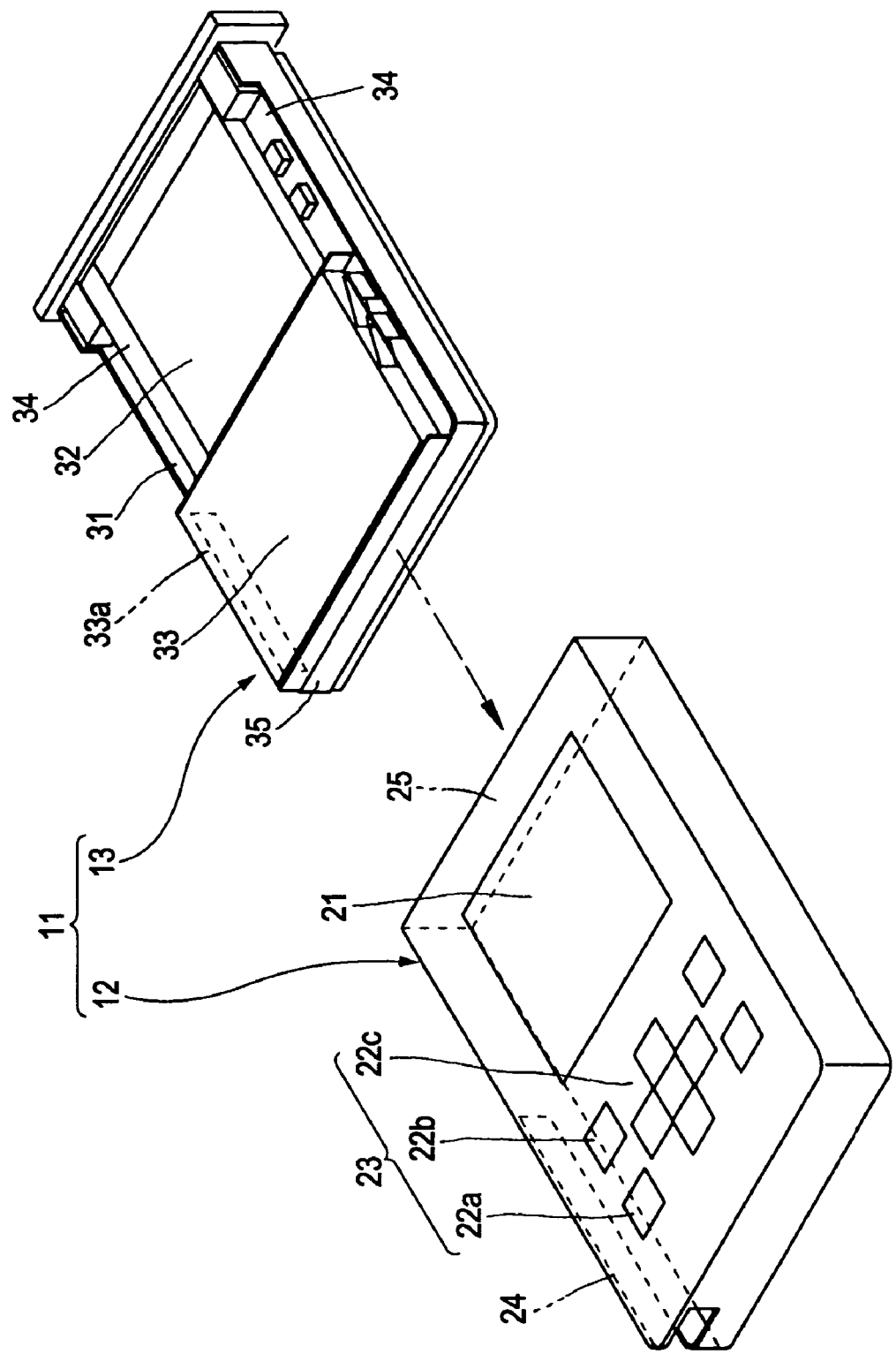
FIG. 5 is a perspective view showing a state in which an apparatus body is detached from a housing.

FIG. 4 illustrates the content reproducing apparatus 11 equipped with the vibration-shock absorbing mechanism described above. The content reproducing apparatus 11 may be, for example, a portable music player serving as a portable terminal for music distribution, or a portable multimedia player that is capable of reproducing moving pictures in addition to music. Referring to FIG. 5, the content reproducing apparatus 11 includes a low-profile rectangular housing 12 and an apparatus body 13 housed inside the housing 12.

The housing 12 is composed of an aluminum alloy or a magnesium alloy and has a low-profile, hollow structure. The top surface of the housing 12 is provided with a monitor display window 21 and an operating portion 23 having various operating buttons 22a, 22b, and 22c. A battery insertion slot 24 is provided on one side surface of the housing 12 and is positioned to the side of the operating portion 23. The battery insertion slot 24 is closable with a cover.

The content reproducing apparatus 11 has an opening 25 at one end of the housing 12. Through this opening 25, the apparatus body 13 can be inserted into the housing 12.

The apparatus body 13 has an upper body portion and a lower body portion with a centrally-located base plate 31 intervening therebetween. The upper body portion of the apparatus body 13 is provided with a display section 32, which displays information, such as a liquid-crystal monitor, a battery holder 33 that holds a battery for supplying power to the apparatus 11, and a printed circuit board 34 holding, for example, a reproducing unit used for content reproducing. On the other hand, the lower body portion of the apparatus body 13 is provided with a hard-disk drive 35, which is a device preferably protected from vibrations and shocks. By inserting the apparatus body 13 into the housing 12, the display section 32, such as a liquid-crystal monitor, becomes aligned with the monitor display window 21, and a slot 33a provided on one side surface of the battery holder 33 becomes aligned with the battery insertion slot 24 provided on one side surface of the housing 12.

Figure 6:
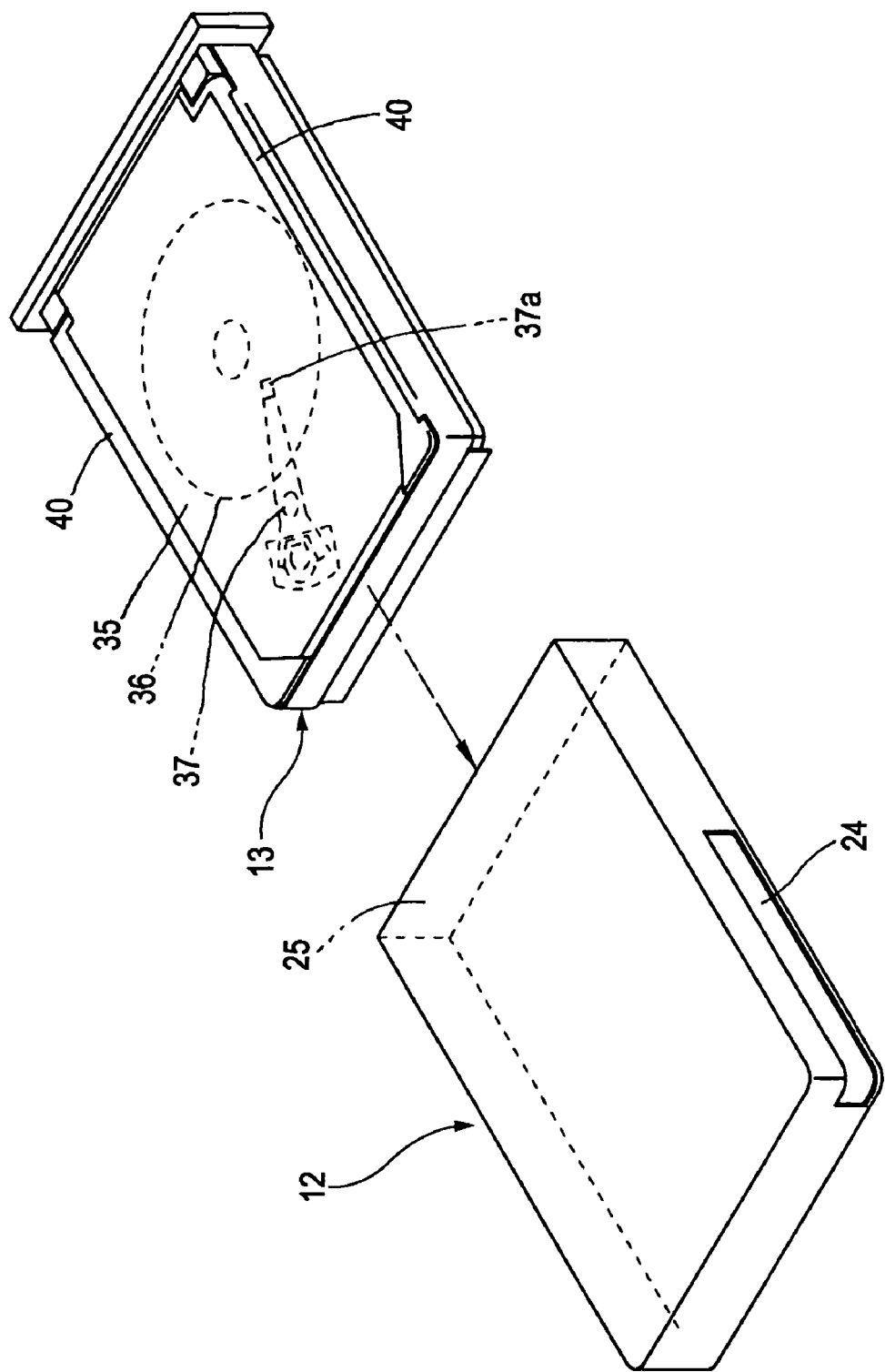
FIG. 6 is a perspective bottom view of FIG. 5.

As shown in FIG. 6, the hard-disk drive 35 has a low-profile rectangular shape. The hard-disk drive 35 includes a storage medium 36 defined by a magnetic disk for storing content, and the head unit 37 serving as a readout unit that reads out the content from the storage medium 36. A resonant frequency range of the head unit 37 according to this embodiment is substantially within 1 KHz to 3 KHz. In an operation mode, the head unit 37 has its head positioned on the magnetic disk serving as the storage medium 36. In a non-operation mode, the head unit 37 has its head withdrawn from the magnetic disk serving as the storage medium 36. Along left and right longitudinal sides of the hard-disk drive 35 are provided shock-absorbing members 40 included in the vibration-shock absorbing mechanism.

Figure 7:
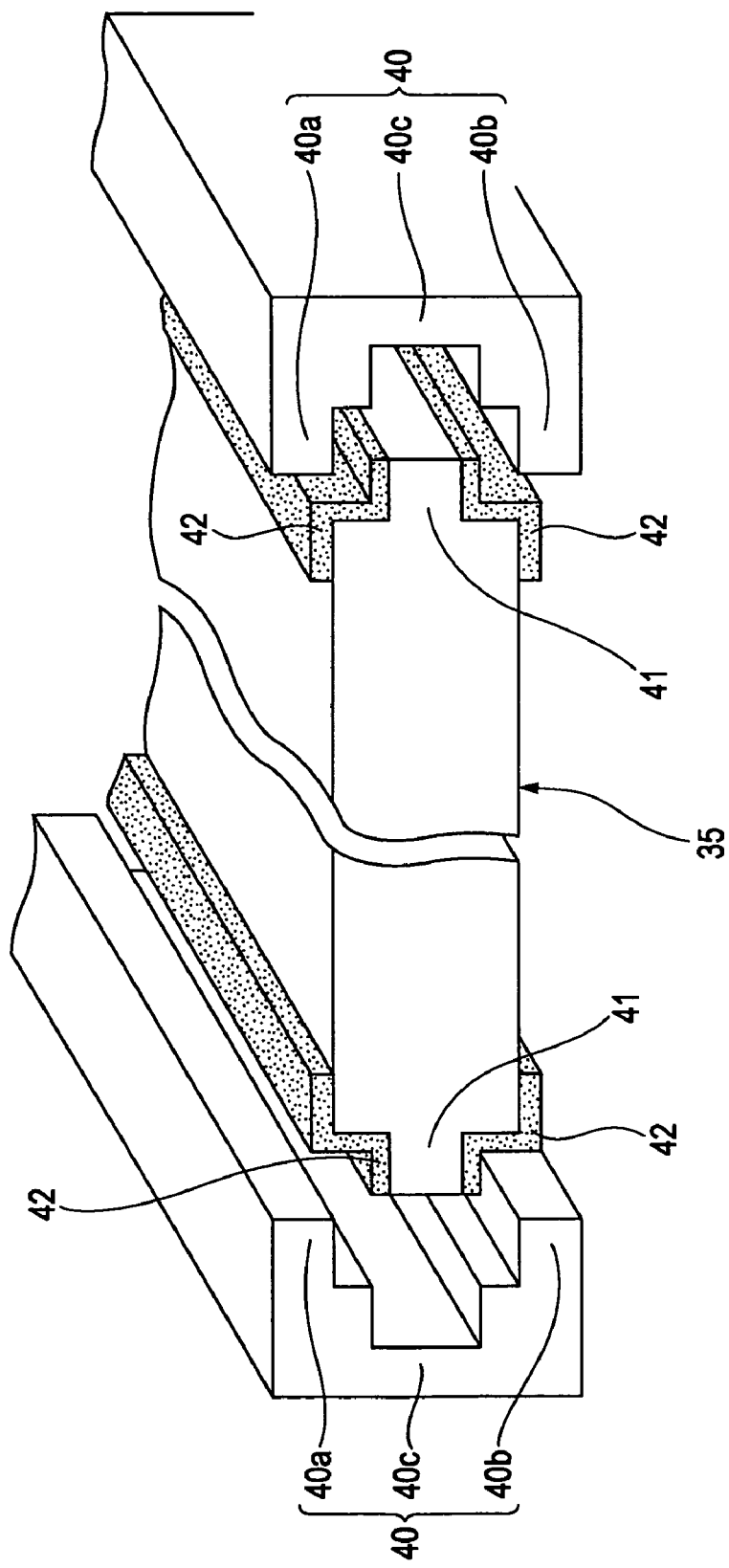
FIG. 7 is a perspective view of shock-absorbing members and a hard-disk drive.

Referring to FIG. 7, the hard-disk drive 35 is provided with shock-absorbing-member attachment portions 41 to which the shock-absorbing members 40 are attached. The attachment portions 41 protrude outward from the left and right longitudinal sides of the hard-disk drive 35.

Each of the shock-absorbing members 40 is substantially C-shaped in cross section, and has a pair of a first upper segment 40a and a second lower segment 40b, and a third mid segment 40c that connects the first and second segments 40a and 40b. The shock-absorbing members 40 are formed of an elastic material, such as rubber and elastomer.

By inserting the attachment portions 41 of the hard-disk drive 35 between the first and second segments 40a, 40b, the shock-absorbing members 40 become engaged to the left and right longitudinal sides of the hard-disk drive 35.

Upper and lower surfaces of each attachment portion 41 of the hard-disk drive 35 are provided with resonance-damping members 42. The resonance-damping members 42 are provided for damping the resonance of the head unit 37 of the hard-disk drive 35 when a vibration or shock is applied to the content reproducing apparatus 11.

The resonance-damping members 42 are composed of a material that dampens or buffers a vibration or shock in a frequency range that is different from that of the shock-absorbing members 40. In detail, the resonance-damping members 42 dampen a vibration or shock in a resonant frequency range of the head unit 37.

The resonance-damping members 42 according to this embodiment have a higher vibration-damping rate in the high frequency range than the shock-absorbing members 40, and are each formed of a nonwoven fabric that effectively dampens a vibration or shock in the resonant frequency range of the device (i.e. the head unit 37 of the hard-disk drive 35), which is substantially within 1 KHz to 3 KHz. Such a nonwoven fabric may be, for example, a chemical-bond nonwoven fabric. The resonance-damping members 42 may be adhered to the upper and lower surfaces of the attachment portions 41 of the hard-disk drive 35 using friction-generating members, such as double-sided tapes.

Consequently, when the shock-absorbing members 40 are engaged to the attachment portions 41, the inner surfaces of the first and second segments 40a and 40b of the shock-absorbing members 40 are in contact with the resonance-damping members 42.

The reason for using a nonwoven fabric as the resonance-damping members 42 for effectively damping a vibration and shock in the resonant frequency range of the head unit 37 will be described below.

Figure 8:
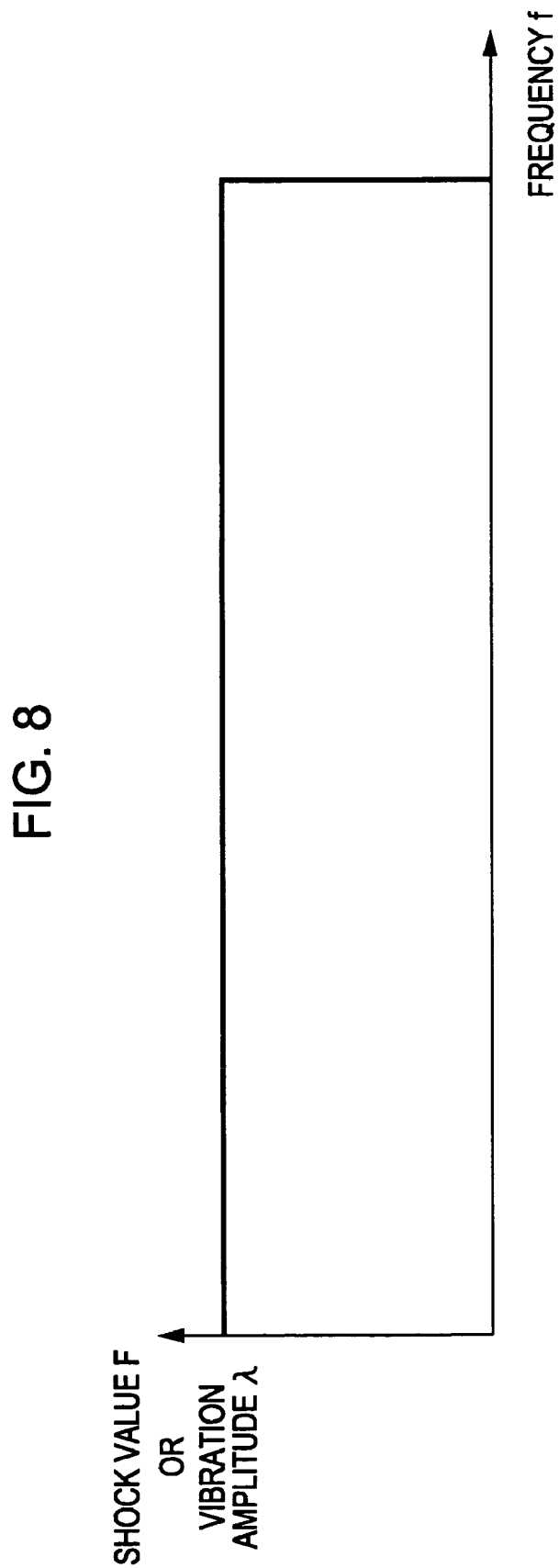
FIG. 8 is a graph illustrating frequency characteristics of a vibration and shock applied to the content reproducing apparatus in an ideal state.

FIG. 8 is a graph illustrating frequency characteristics of a vibration and shock applied to the head unit 37 of the content reproducing apparatus 11. The graph shows a shock and vibration having a constant shock value and vibration amplitude over a broad frequency range.

Figure 9:
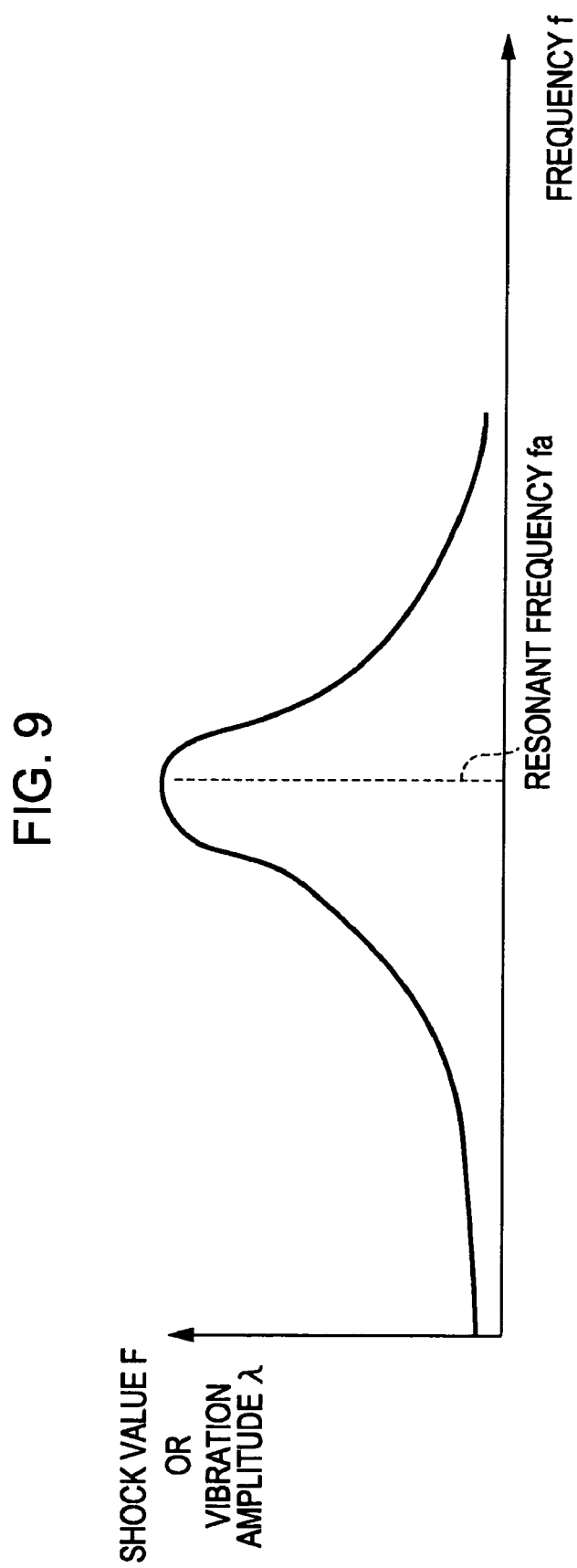
FIG. 9 is a graph illustrating a frequency response of a head unit of the content reproducing apparatus.

FIG. 9 is a graph illustrating an example of a frequency response of the head unit 37 in the content reproducing apparatus 11. In a case where a resonant frequency of the head unit 37 is indicated by fa HZ, the head unit 37 resonates and vibrates intensely when a shock or vibration having a frequency of fa HZ is applied to the head unit 37. Therefore, the possibility of the head unit 37 hitting against the disk surface is high.

Figure 10:
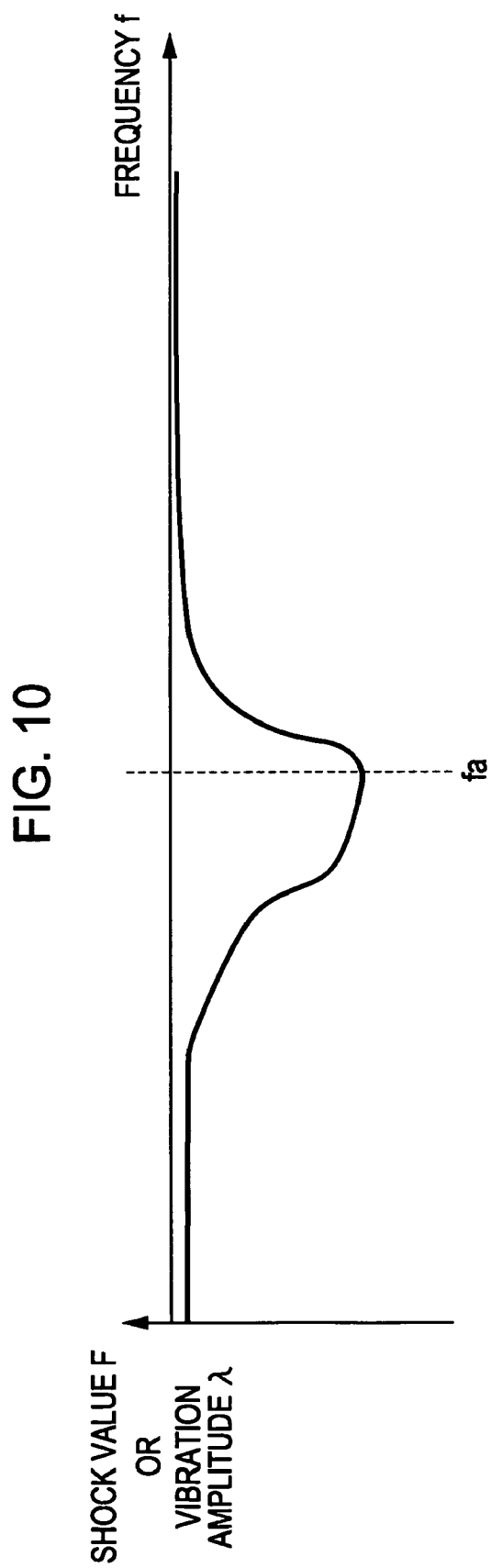
FIG. 10 is a graph illustrating vibration-damping characteristics of a nonwoven fabric.

FIG. 10 is a graph illustrating an example of vibration-damping characteristics of a nonwoven fabric used as the resonance-damping members 42. It is understandable from the graph in FIG. 10 that the nonwoven fabric has the maximum capability to dampen a shock or vibration having a frequency of fa HZ. This nonwoven fabric having such characteristics will be used as the resonance-damping members 42 in the content reproducing apparatus 11.

Figure 11:
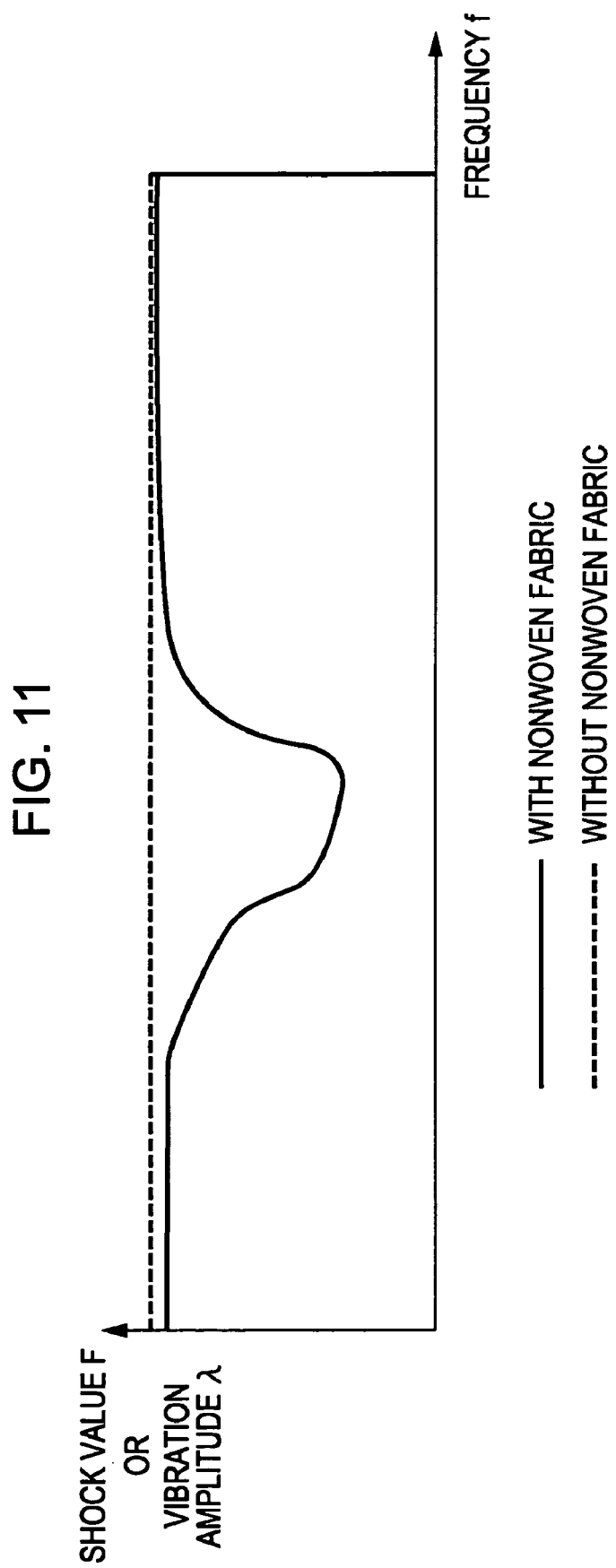
FIG. 11 is a graph illustrating frequency characteristics of a vibration and shock applied to the content reproducing apparatus equipped with the nonwoven fabric in an ideal state.

FIG. 11 is a graph illustrating a shock or vibration received by the head unit 37 when the shock or vibration shown in FIG. 8 is applied to the content reproducing apparatus 11. In FIG. 11, a solid line indicates an example in which the nonwoven fabric is used in the content reproducing apparatus 11, whereas a dotted line indicates an example in which the nonwoven fabric is not used in the content reproducing apparatus 11. The shock or vibration applied to the head unit 37 differs between these two examples by an amount of shock or vibration dampened by the nonwoven fabric.

In the content reproducing apparatus 11 with the nonwoven fabric, the vibration or shock applied to the head unit 37 is reduced near the resonant frequency fa Hz of the head unit 37.

Specifically, the dotted line in FIG. 11 shows an ideal example in which a shock or vibration applied to the content reproducing apparatus 11 is directly transmitted to the head unit 37 without being dampened nor buffered. On the other hand, the solid line is a contrast to the ideal example and shows a damping effect using only the nonwoven fabric.

Figure 12:
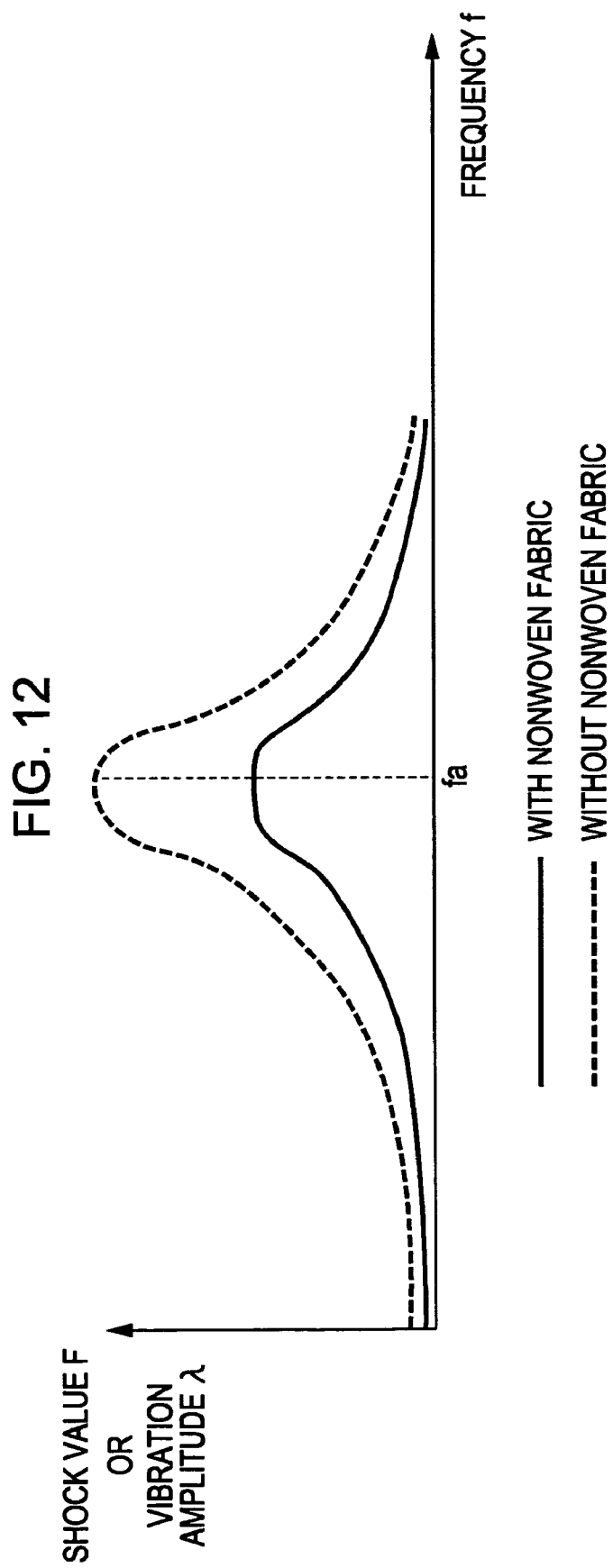
FIG. 12 is a graph illustrating a frequency response of a shock and vibration of the head unit in a case where the content reproducing apparatus receives a shock and vibration in the ideal state shown in FIG. 8.

FIG. 12 is a graph illustrating a frequency response of the head unit 37 in a case where the shock and vibration indicated by the dotted line and the solid line in FIG. 11 are applied to the head unit 37. When the nonwoven fabric is not used, the head unit 37 receives the shock and vibration as shown with the dotted line in FIG. 11. On the other hand, when the nonwoven fabric that dampens the shock and vibration in the resonant frequency range of the head unit 37 is used, the head unit 37 receives the shock and vibration that are reduced in the resonant frequency range of the head unit 37, as shown with the solid line in FIG. 11. Consequently, the comparison between the usage and non-usage of the nonwoven fabric shows that when the content reproducing apparatus 11 receives a certain shock value and vibration amplitude, the resonance of the head unit 37 is reduced more effectively with the usage of the nonwoven fabric.

Accordingly, instead of using a simple nonwoven fabric, the nonwoven fabric used as the resonance-damping members 42 of the content reproducing apparatus 11 in this embodiment has the capability to effectively dampen vibrations and shocks within the resonant frequency range of the device, which is substantially within 1 KHz to 3 KHz.

Second Embodiment

In the first embodiment, each resonance-damping member 5 intervenes the whole contact plane between the first or second segment 4a or 4b of the corresponding shock-absorbing member 4 and the object 3 to be protected, as shown in FIG. 3. In contrast, referring to FIG. 13, each resonance-damping member 5 according to a second embodiment of the present invention intervenes a part of the contact plane between the first or second segment 4a or 4b of the corresponding shock-absorbing member 4 and the object 3.

Figure 13:
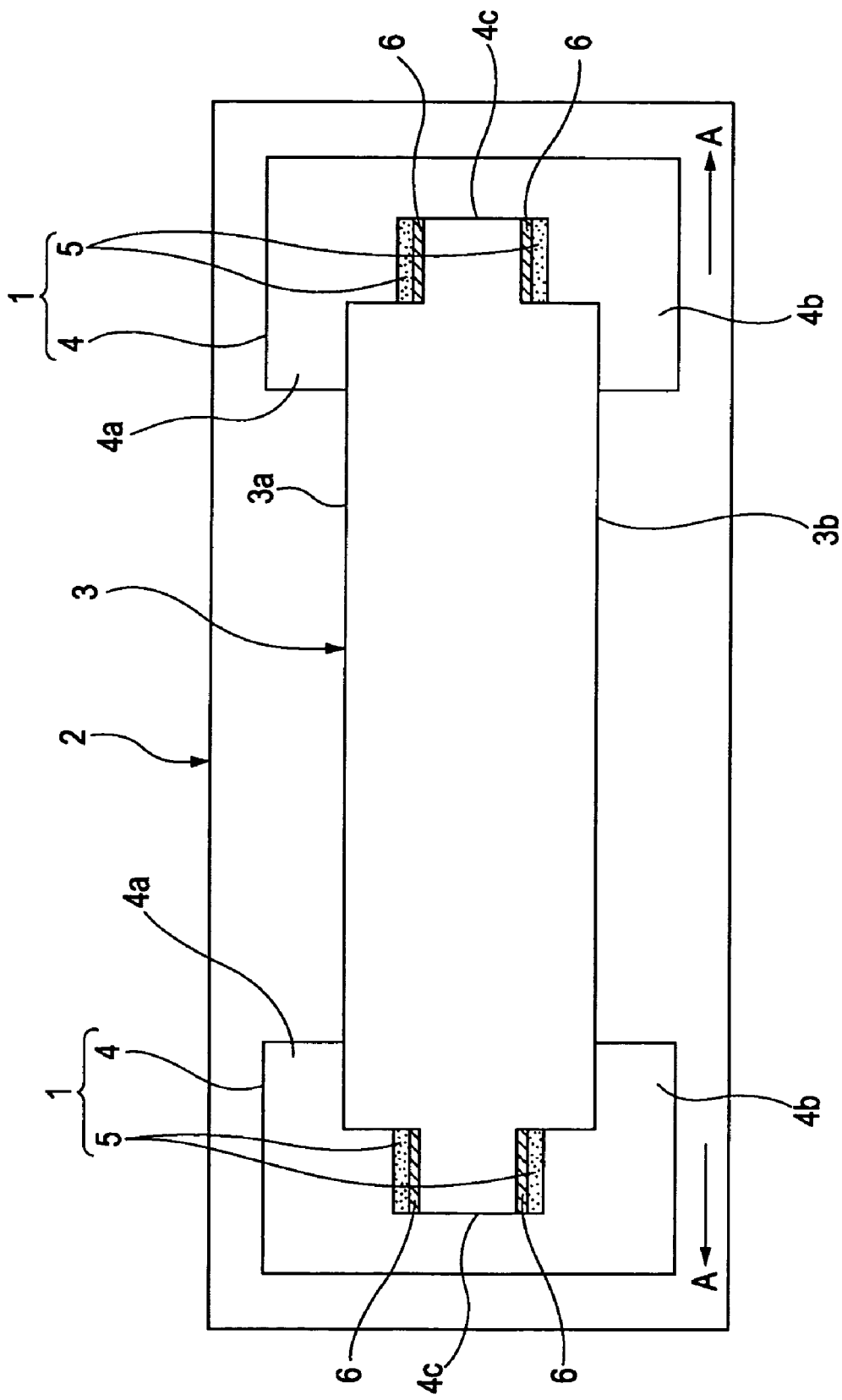
FIG. 13 is a cross-sectional view of a vibration-shock absorbing mechanism and a content reproducing apparatus according to a second embodiment of the present invention.

This means that each shock-absorbing member 4 is partially in direct contact with the object 3 in the second embodiment. Thus, a shock and vibration in the resonant frequency range of the object 3 become greater in comparison to the structure in which the resonance-damping members 5 intervene the whole contact plane between the object 3 and the first and second segments 4a, 4b of the shock-absorbing members 4. However, if the object 3 to be protected has a complicated multilevel structure as shown in FIG. 13, the resonance-damping members 5 may be disposed only in a part of the contact plane between the object 3 and the first and second segments 4a, 4b of the shock-absorbing members 4 in view of, for example, easier installation of the resonance-damping members 5.

The description below is directed to an actual experiment that was performed to test the effects of the resonance-damping members 5 according to the second embodiment.

Figure 14:
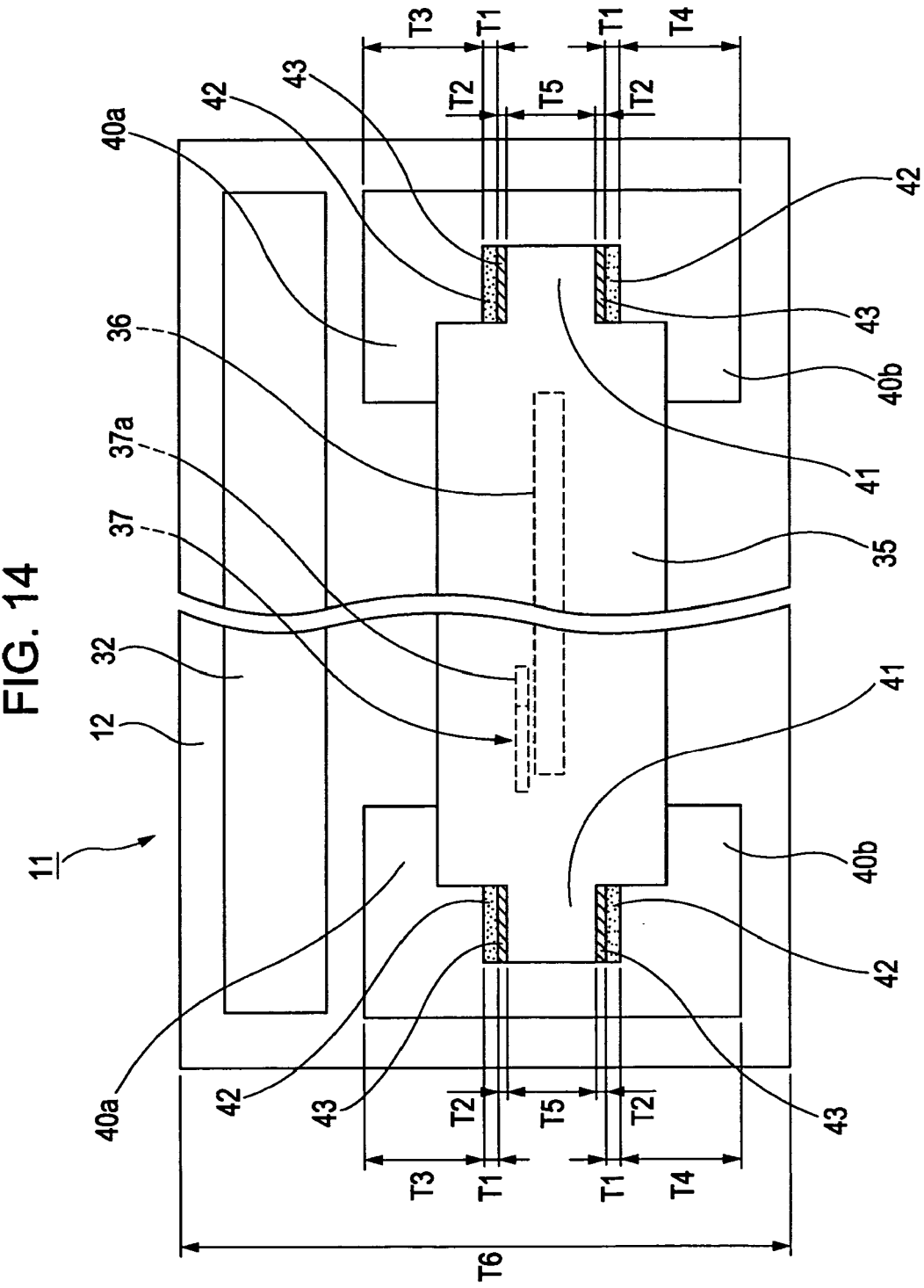
FIG. 14 is a schematic cross-sectional view of the content reproducing apparatus according to the second embodiment of the present invention.

Referring to FIG. 14, each of the resonance-damping members 42 is formed of a strip of chemical-bond nonwoven fabric having a thickness T1 of 0.15 mm and a weight of 45 g/m². The resonance-damping members 42 are adhered to the upper and lower surfaces of the attachment portions 41 with double-sided tapes 43 having a thickness T2 of 0.05 mm. The first segment 40a of each shock-absorbing member 40 is given a thickness T3 of 1.85 mm, and the second segment 40b is given a thickness T4 of 1.75 mm. The content reproducing apparatus 11 is given an overall thickness T6 of 6.9 mm, and each of the attachment portions 41 is given a thickness T5 of 3.3 mm.

Figure 15:
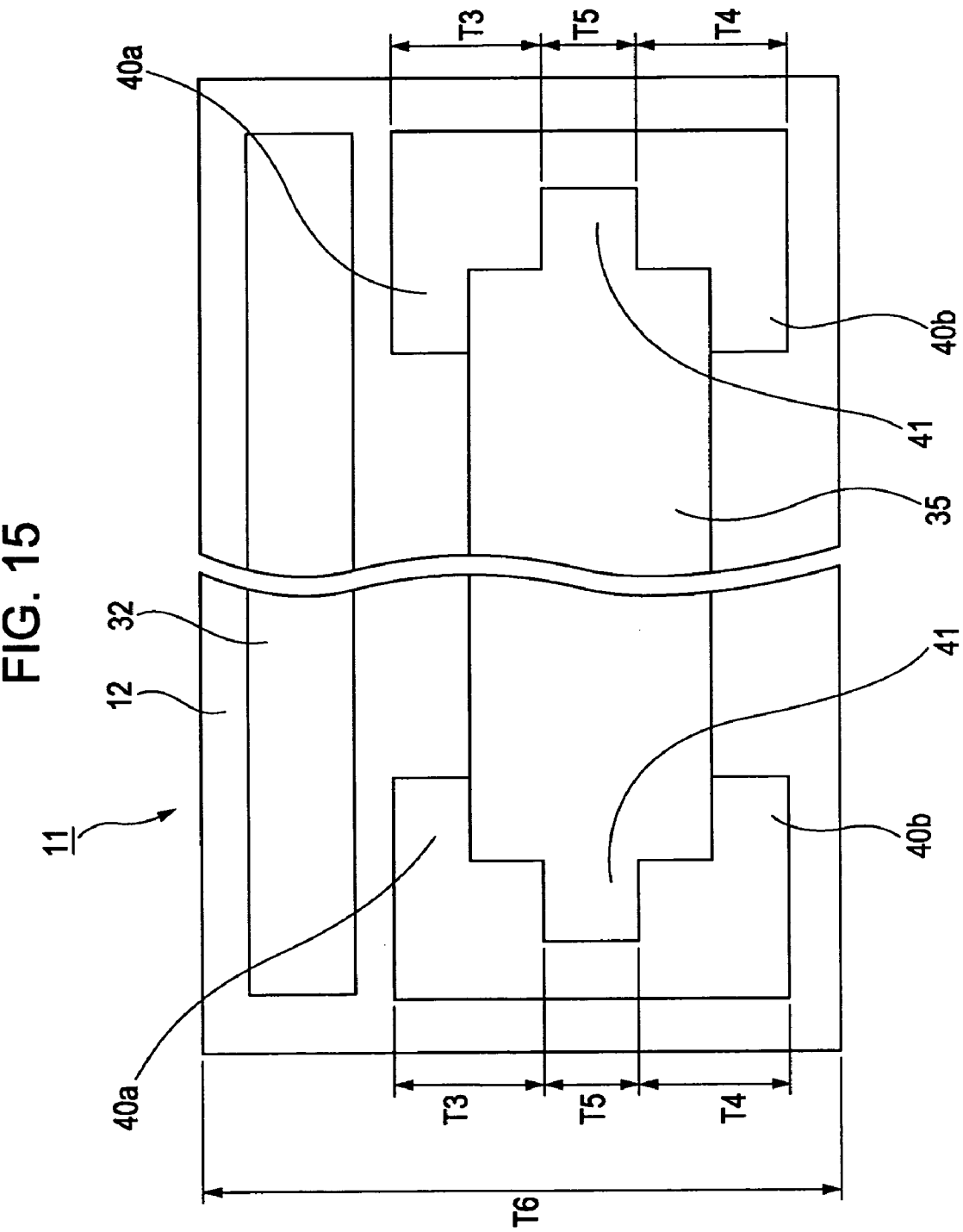
FIG. 15 is a schematic cross-sectional view of a content reproducing apparatus as a comparison example to the content reproducing apparatus according to the embodiment of the present invention.

FIG. 15 illustrates a content reproducing apparatus not equipped with the resonance-damping members 42 as a comparison example to the content reproducing apparatus 11 according to the second embodiment of the present invention. In the content reproducing apparatus of the comparison example, the first segment 40a of each shock-absorbing member 40 is given a thickness T3 of 2.2 mm, and the second segment 40b is given a thickness T4 of 2.1 mm. The content reproducing apparatus of the comparison example is given an overall thickness T6 of 7.6 mm, and each of the attachment portions 41 is given a thickness T5 of 3.3 mm. Other configurations of the content reproducing apparatus are substantially the same as those of the content reproducing apparatus 11 according to the second embodiment shown in FIG. 14.

Figure 16:
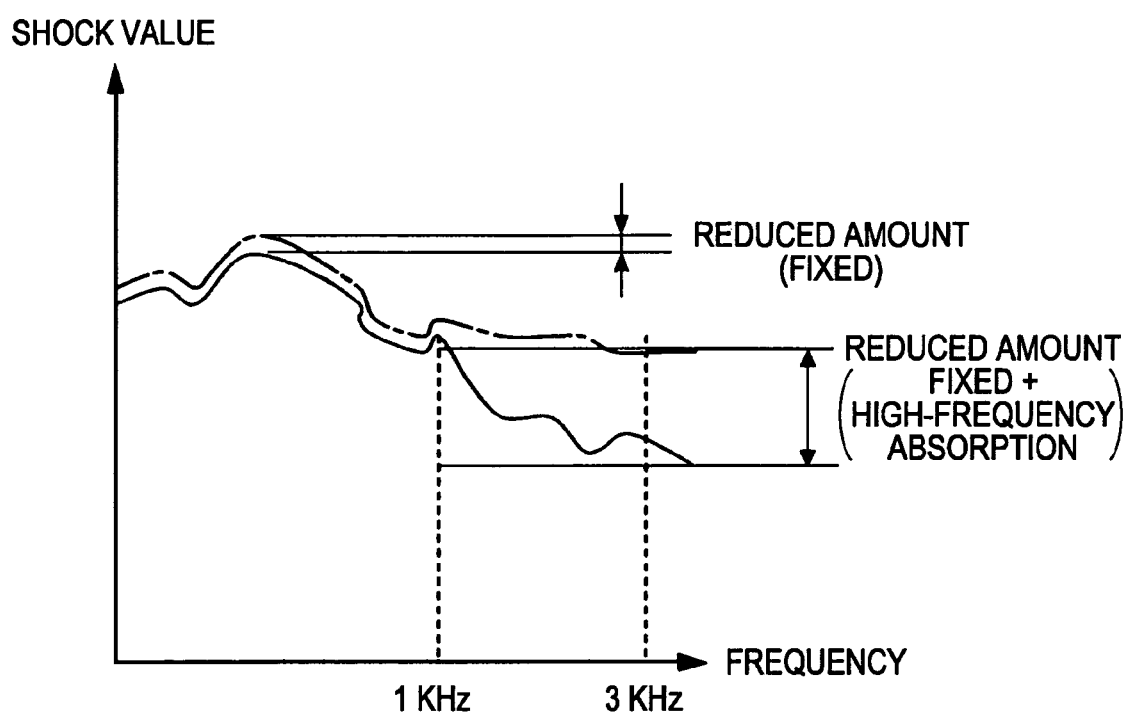
FIG. 16 is a graph illustrating the advantages of the content reproducing apparatus according to the embodiment of the present invention.

FIG. 16 is a graph illustrating shock or vibration characteristics obtained when the content reproducing apparatus 11 according to the second embodiment in an operation mode is dropped from a predetermined height of, for example, 16 cm. In FIG. 16, a dashed line indicates a shock characteristic curve of a content reproducing apparatus not equipped with the resonance-damping members 42, and a solid line indicates a shock characteristic curve of the content reproducing apparatus 11 equipped with the resonance-damping members 42 according to the second embodiment. In contrast to the solid line in FIG. 11 showing the characteristics of the shock value and vibration amplitude received by the head unit 37 of the content reproducing apparatus 11 in the ideal state, FIG. 16 shows vibration characteristics obtained when, for example, the content reproducing apparatus 11 is actually dropped. As is apparent from the comparison between the two shock characteristic curves, a shock value in the resonant frequency range of the head unit 37, i.e. 1 KHz to 3 KHz, is lower in the content reproducing apparatus 11 equipped with the resonance-damping members 42 according to the second embodiment of the present invention. The reason that the shock value is lower is that the frequency at which the content reproducing apparatus 11 can absorb the shock and vibration to the maximum degree is shifted to the high frequency range of 1 KHz to 3 KHz due to the nonwoven fabric used as the resonance-damping members 42. Since the vibration in the 1 KHz to 3 KHz range, which is the resonant frequency range of the head unit 37, is dampened, the resonance of the head unit 37 is reduced. Accordingly, this prevents the head unit 37 from hitting against the storage medium 36 and also prevents the head unit 37 from being damaged due to its own vibration.

Although an object to be protected is directed to the hard-disk drive 35 in the content reproducing apparatus 11 according to the above embodiments, an object to be protected may include any type of device that is preferably protected from vibrations and shocks. Furthermore, although the resonance-damping members 42 may be formed of a material that has a capability to prevent, for example, displacement of the shock-absorbing members 40, the resonance-damping members 42 are more preferably formed of a material that has a capability to dampen a vibration and shock in the resonant frequency range of the device. Similar to the vibration-shock absorbing mechanism 1 described above, the resonance-damping members 42 may alternatively be formed of paper.

Furthermore, although a resonant frequency of the object 3 may include, for example, the resonant frequency of the housing of the content reproducing apparatus 11, the resonant frequency in the above embodiments is directed to a resonant frequency of the head unit 37, which affects reading and writing operations with respect to a hard disk.

Furthermore, although the above embodiments are directed to an example of a portable audio player, the above embodiments may also be applied to a stationary content reproducing apparatus, such as a DVD player and an audio apparatus equipped with a hard disk.

In a case where the resonance-damping members 5 are not to be used for preventing displacement of the shock-absorbing members 4, the upper and lower main surfaces 3a and 3b of the object 3 may be provided with rough sections. By allowing the shock-absorbing members 4 to be in contact with the rough sections, the displacement of the shock-absorbing members 40 with respect to the hard-disk drive 35, i.e. the object 3 to be protected, can be prevented without the use of the resonance-damping members 5.

Furthermore, although the shock-absorbing members 40 and the resonance-damping members 42 are disposed so as to nip the hard-disk drive 35 from the upper and lower main surfaces thereof in the above embodiments, the shock-absorbing members 40 and the resonance-damping members 42 may alternatively be provided on only one of the upper and lower main surfaces of the hard-disk drive 35.

In the vibration-shock absorbing mechanism according to the above embodiments of the present invention, the shock-absorbing members and the object to be protected have therebetween the resonance-damping members that dampen a vibration or shock in a frequency range that is different from the frequency range absorbed by the shock-absorbing members. Therefore, the resonance of the object can be reduced by the resonance-damping members. Moreover, due to a frictional force generated between the resonance-damping members and the shock-absorbing members, the shock-absorbing members can be prevented from being displaced from the object. Furthermore, as described above, the shock-absorbing members and the resonance-damping members nip the object from the upper and lower main surfaces of the object. Moreover, the resonance-damping members are disposed in at least one of a space between the upper main surface of the object and the shock-absorbing members and a space between the lower main surface of the object and the shock-absorbing members. Consequently, this effectively reduces the possibility of the shock-absorbing members being displaced from both upper and lower main surfaces of the object or one of the main surfaces.

In the content reproducing apparatus according to the above embodiments, the shock-absorbing members and the resonance-damping members protect a device, i.e. an object to be protected, from vibrations and shocks. In particular, since the resonance-damping members are formed of a material that dampens a vibration and shock in a resonant frequency range of the device, a vibration and shock in the resonant frequency range of the device can be dampened when the content reproducing apparatus receives a vibration or shock. Furthermore, since the shock-absorbing members and the resonance-damping members are disposed on both of or one of the upper and lower main surfaces of the device to be protected, the shock-absorbing members can be effectively prevented from being displaced from both of or one of the upper and lower main surfaces of the device.

Furthermore, in the content reproducing apparatus according to the above embodiments, the second lower segments of the shock-absorbing members are opposed to the readout unit across the storage medium. Accordingly, since the shock-absorbing members can effectively absorb a shock applied in a direction in which the readout unit is pressed against the storage medium, the readout unit can be securely protected.

Furthermore, in a case where the content reproducing apparatus is dropped with the display section facing upward, the second lower segments of the shock-absorbing members disposed distant from the display section receive a greater degree of shock than the first upper segments of the shock-absorbing members disposed closer to the display section. In that case, the second lower segments may be subject to displacement. However, of the first and second segments of the shock-absorbing members nipping the device from the upper and lower main surfaces thereof, the second lower segments of the shock-absorbing members disposed distant from the display section and the corresponding main surface of the device have the resonance-damping members disposed therebetween. Accordingly, the shock-absorbing members are prevented from being displaced from the device.

Furthermore, since a resonance of the hard-disk drive generated in response to a vibration or shock can be effectively dampened by the resonance-damping members, a proper reproducing operation, for example, can be performed in the hard-disk drive. Moreover, an accidental deletion of data caused by a vibration or shock can also be prevented.

It should be understood by those skilled in the art that various modifications, combinations, sub-combinations and alterations may occur depending on design requirements and other factors insofar as they are within the scope of the appended claims or the equivalents thereof.

What is claimed is:

1. A vibration-shock absorbing mechanism that protects an object disposed in a housing, the object having upper and lower surfaces, the vibration-shock absorbing mechanism comprising:
    a shock-absorbing member, disposed in the housing, adapted to absorb a shock, the shock-absorbing member being adapted to damp a vibration in a first frequency range; and
    a resonance-damping member, comprising a nonwoven fabric, disposed between the object and the shock-absorbing member, the resonance-damping member being adapted to damp a vibration in a second frequency range which includes a resonant frequency of the object, the second frequency range comprising frequencies not in the first frequency range;
    wherein the shock-absorbing member nips the object from upper and lower main surfaces of the object, and wherein the resonance-damping member is disposed in at least one of a space between the upper main surface of the object and the shock-absorbing member and a space between the lower main surface of the object and the shock-absorbing member.

2. The vibration-shock absorbing mechanism according to claim 1, wherein the resonance-damping member disposed between the object and the shock-absorbing member is formed of a material having a coefficient of friction higher than that of the shock-absorbing member.

3. The vibration-shock absorbing mechanism according to claim 2, wherein the resonance-damping member and the object have friction-generating means disposed therebetween, the friction-generating means having a coefficient of friction higher that that of the resonance-damping member.

4. A content reproducing apparatus comprising:
    a housing;
    a storage medium that stores the content;
    a device disposed in the housing and having readout means configured to read out content from the storage medium, the device having upper and lower surfaces;
    a shock-absorbing member disposed in the housing that nips the device from the upper and lower surfaces of the device, the shock-absorbing member being adapted to damp a vibration in a first frequency range;
    a resonance-damping member, comprising a nonwoven fabric, disposed in at least one of a space between the upper surface of the device and the shock-absorbing member and a space between the lower surface of the device and the shock-absorbing member, the resonance-damping member being formed of a material having a coefficient of friction higher than that of the shock-absorbing member, the resonance-damping member being adapted to damp a vibration in a second frequency range which includes a resonant frequency of the device, the second frequency range comprising frequencies not in the first frequency range; and
    reproducing means configured to reproduce the content.

5. The content reproducing apparatus according to claim 4, wherein the content reproducing apparatus is a portable apparatus.

6. The content reproducing apparatus according to claim 4, wherein the resonance-damping member and the device have friction-generating means disposed therebetween, the friction-generating means having a coefficient of friction higher that that of the resonance-damping member.

7. The content reproducing apparatus according to claim 4, wherein the shock-absorbing member is opposed to the readout means across the storage medium.

8. The content reproducing apparatus according to claim 4, further comprising display means configured to display information,
    wherein the shock-absorbing member is disposed in a contact section that is distant from the display means.

9. A content reproducing apparatus comprising:
    a housing;
    a storage medium that stores the content;
    a device disposed in the housing and having a readout unit configured to read out content from the storage medium, the device having upper and lower surfaces;
    a shock-absorbing member, disposed in the housing, that nips the device from the upper and lower surfaces of the device, the shock-absorbing member being adapted to damp a vibration in a first frequency range;
    a resonance-damping member, comprising a nonwoven fabric, disposed in at least one of a space between the upper surface of the device and the shock-absorbing member and a space between the lower surface of the device and the shock-absorbing member, the resonance-damping member being adapted to damp a vibration and shock in a second frequency range which includes a resonant frequency of the device, the second frequency range comprising frequencies not in the first frequency range; and
    a reproducing unit configured to reproduce the content.

10. A method for protecting a portable content producing apparatus comprising a disk drive disposed in a housing, the disk drive having a head configured to read content from a disk storing the content, the method comprising:
    (A) disposing a shock absorbing member between the housing and the disk drive to absorb a shock received by the portable content reproducing apparatus, the shock-absorbing member being adapted to damp a vibration in a first frequency range; and
    (B) disposing a resonance-damping member, comprising a nonwoven fabric, between the shock absorbing member and the disk drive, the resonance-damping member being adapted to damp a vibration in a second frequency range which includes a resonant frequency of the disk drive, the second frequency range comprising frequencies not in the first frequency range.

11. A vibration-shock absorbing mechanism that protects an object disposed in a housing, the vibration-shock absorbing mechanism comprising:
    a shock-absorbing member that is disposed in the housing and absorbs a shock, the shock-absorbing member being adapted to damp a vibration in a first frequency range; and
    a resonance-damping member, comprising a nonwoven fabric, disposed between the object and the shock-absorbing member, the resonance-damping member being adapted to damp a vibration in a second frequency range which includes a resonant frequency of the object, the second frequency range comprising frequencies not in the first frequency range;
    wherein the resonance-damping member disposed between the object and the shock-absorbing member is formed of a material having a coefficient of friction higher than that of the shock-absorbing member.

12. The vibration-shock absorbing mechanism according to claim 11, wherein the resonance-damping member and the object have friction-generating means disposed therebetween, the friction-generating means having a coefficient of friction higher that that of the resonance-damping member.

* * * * *